United States Patent [19]

Takatsu et al.

[11] Patent Number: 4,472,741
[45] Date of Patent: Sep. 18, 1984

[54] SOLID-STATE AREA IMAGING DEVICE

[75] Inventors: Norihiko Takatsu, Kawasaki; Masaki Isogai, Tokyo; Atsushi Kawahara, Kawasaki, all of Japan

[73] Assignee: Nippon Kogaku K.K., Tokyo, Japan

[21] Appl. No.: 425,908

[22] Filed: Sep. 28, 1982

[30] Foreign Application Priority Data

Jan. 8, 1982 [JP] Japan ........................... 57-984

[51] Int. Cl.$^3$ ............................................. H04N 3/14
[52] U.S. Cl. ..................................................... 358/213
[58] Field of Search ................ 358/212, 213, 241, 293

[56] References Cited

U.S. PATENT DOCUMENTS

| 4,336,557 | 6/1982 | Koch | 358/213 |
| 4,396,950 | 8/1983 | Roth | 358/213 |
| 4,432,017 | 2/1984 | Stoffel | 358/213 |

FOREIGN PATENT DOCUMENTS 12179 2/1981 Japan .................................. 358/213

Primary Examiner—Tommy P. Chin
Attorney, Agent, or Firm—Michael N. Meller

[57] ABSTRACT

A solid-state area imaging device for electronic still picture cameras which is so designed that when a playbacked picture is viewed on a television receiver of the interlaced scanning type, its vertical resolution is improved up to about that of the ordinary broadcast received picture. In the solid-state area imaging device, the signal charges from a large number of photosensitive elements arranged into a two-dimensional array are transmitted to two horizontal transferring CCDs, whereby the odd field signal charges are taken from one of the horizontal transferring CCDs and the even field signal charges are taken from the other horizontal transferring CCD independently of each other.

3 Claims, 3 Drawing Figures

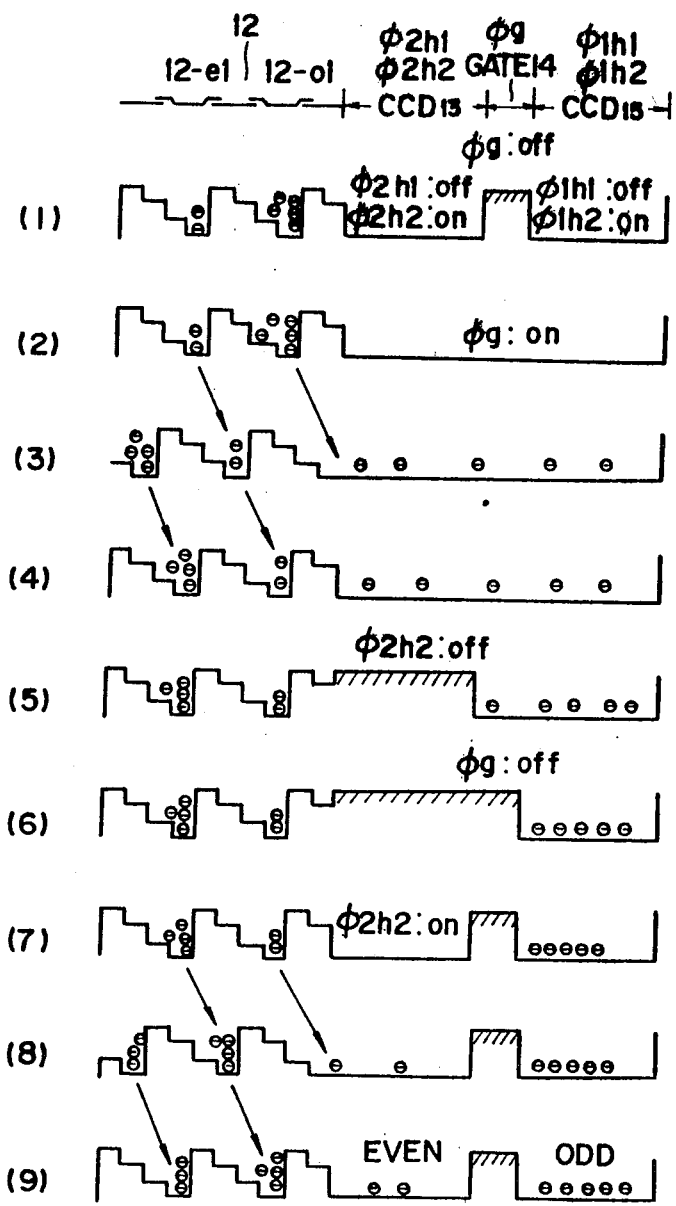

SOLID-STATE AREA IMAGING DEVICE

BACKGROUND OF THE INVENTION

The present invention relates to solid-state area imaging devices for electronic still picture cameras and more particularly to a solid-state area imaging device well suited for recording a still picture for playback on a television receiver of the interlaced scanning type.

The solid-state area imaging devices heretofore known for use in video cameras including for example IT-CCD (interline transfer-charge coupled device), FT-CCD (frame transfer-charge coupled device) and MOS (metal oxide semiconductor) devices.

As regards the IT-CCD, this device has rows of photosensitive elements arranged alternate with rows of vertical transfer registers on its photosensitive surface and thus an image light signal of an optical image is applied simultaneously to each of the photosensitive elements. However, since the transfer of output signals from the photosensitive elements must be effected separately for each of the odd and even fields thereby transferring the output signals alternately field by field so that an interlaced signal is produced, while no difficulty will be caused if a mechanical shutter is used, where a still picture is to be produced without using any mechanical shutter, any difference in the image information due to the difference in the exposure time will be caused between the fields since during the time that the output signals from the photosensitive elements for one of the fields are transferred vertically (1/60 sec.) the photosensitive elements for the other field are exposed continuously. As a result, where a moving object is shot and the video signals obtained from the resulting optical image information is recorded as a still picture, the playback of the still picture can result only in a blurred reproduced still picture.

Thus, it is necessary to playback the still picture on the basis of the video signals of only one or the other of the two fields in accordance with a pseudo-interlaced scanning system and consequently the vertical resolution of the video signals at the television receiver output is in principle reduced to about one half that obtained according to the ordinary interlaced scanning system.

In the case of the FT-CCD, the photosensitive section also serves as a transfer section so that considering a high-speed shutter, the light to the photosensitive section must be intercepted during the period of vertical transfer from the photosensitive section to the storage section and therefore a mechanical shutter must be used. However, even if a mechanical shutter is provided, due to the construction of the FT-CCD, the light can be received effectively at a place corresponding to only one or the other of the fields so that even if the video-signals of this single field are subjected to the pseudo-interlaced scanning and the still picture is reproduced on a television receiver, theoretically the vertical resolution is about one-half the interlaced output as in the case of the IT-CCD.

Then, consider a case where the number of the vertical transfer registers in the existing IT-CCD is doubled so as to increase the vertical resolution of a still picture. In this case, while 525 scanning lines required for one frame of the American TV system standards, for example, can be obtained for the light signal of the still picture, the number of the horizontal readout stages is one and thus the odd and even field signals are generated alternately line by line. Then, to apply to the television receiver, the input signals must be such that the interlacing signals or the odd field signals $O_1, O_2, \ldots O_{262}$ are applied continuously and then the even signals $e_1, e_2, e_{262}$ are applied continuously and thus the output must be converted to the required interlacing signals by a signal processing unit. This signal processing must be such that from the odd and even field signals generated alternately line by line, that is, the signals $O_1, e_1, O_2, e_2, \ldots$, only the odd field signals and the even field signals, respectively, are extracted. In other words, it is necessary that signals $O_1$, BL, $O_2$, BL, $O_3$, BL, $\ldots O_{262}$ and $e_1$, BL, $e_2$, BL, $e_3$, BL, $\ldots e_{262}$ are generated (each BL representing a blank) and then the operation of reducing the time intervals of the blanks BL in the odd and even fields is performed thereby producing the required odd field signals $O_1, O_2, O_3, \ldots, O_{262}$ and even field signals $e_1, e_2, e_3, \ldots e_{262}$. Thus there is the disadvantage of requiring a very complicate signal processing.

It is apparent that the FT-CCD, MOS device, CPD (charge priming device), etc., also include the single-stage horizontal readout CCD and thus they have the same disadvantage as mentioned above.

SUMMARY OF THE INVENTION

The present invention has been made to overcome the foregoing deficiencies in the prior art and it is the primary object of the invention to provide a solid-state area imaging device capable of producing interlaced signals of the same vertical resolution as the pictures reproduced on the receiver by the ordinary television broadcasting without any complicated external signal processing.

In accordance with the present invention there is thus provided a solid-state area imaging device comprising photoelectric conversion means including a large number of photosensitive elements arranged into a two-dimensional array, vertical transmitting means for transmitting the charges produced by the photosensitive elements successively with respect to the vertical direction of the two-dimensional array, first horizontal transferring means whereby the charges transmitted by the vertical transmitting means are transferred and outputted in the horizontal direction of the two-dimensional array, second horizontal transferring means arranged in juxtaposition with the first horizontal transferring means, and gate means disposed between the first and second horizontal transferring means such that the charges transmitted to the first horizontal transferring means by the vertical transmitting means are selectively transferred with respect to the alternate horizontal lines of the two-dimensional array, whereby of the output signals for the odd scanning lines and the output signals for the even scanning lines in the frame one of the two is taken from the first horizontal transferring means and the other is taken from the second transferring means.

Each of the first and second horizontal transferring means comprises a so-called horizontal readout CCD and the second horizontal readout CCD is arranged in juxtaposition and connected to the first horizontal readout CCD through the gate electrode. The gate electrode is controlled such that of the odd and even field signal charges transmitted successively line by line from the vertical transferring means only the signal charges for one of the fields are transferred to the first horizontal readout CCD and the signal charges for the other field are selectively transferred to the second horizontal readout CCD, thereby continuously delivering as outputs only the odd field signals from one of the two horizontal readout CCD and only the even field signals from the other horizontal readout CCD.

The above and other objects as well as advantageous features of the invention will become more clear from the following description taken in conjunction with the attached drawings.

BRIEF DESCRIPTION OF THE DRAWINGS

FIG. 2 shows a transfer process for explaining the timing of transferring a pair of odd and even field signal charges to horizontal readout CCDs during the horizontal blanking time in the solid-state area imaging device.

DESCRIPTION OF THE PREFERRED EMBODIMENT

Figure 1:
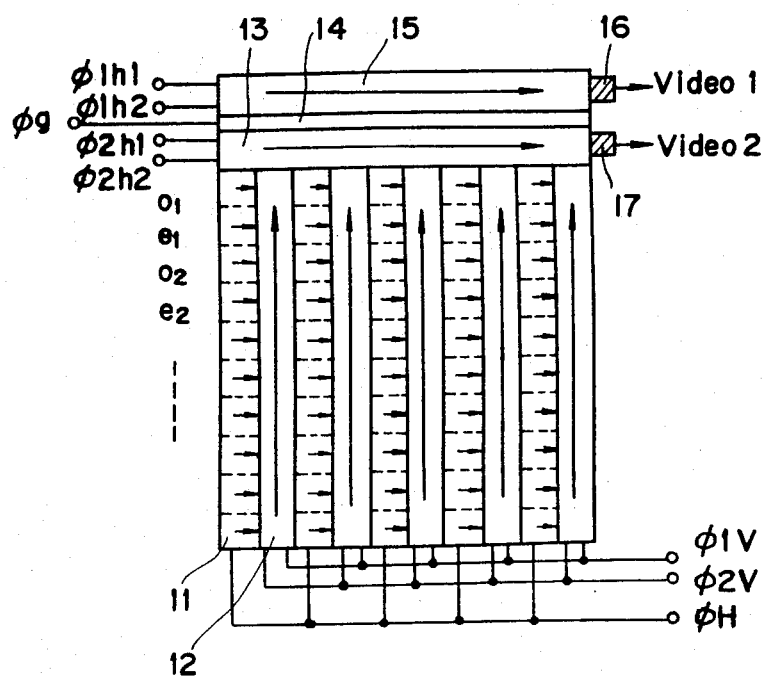
FIG. 1 shows the construction of a solid-state area imaging device according to an embodiment of the invention.

FIG. 1 shows schematically the construction of a solid-state area imaging device employing IT-CCDs according to an embodiment of the invention. In the Figure, odd field photodiodes 11 ($O_1$, $O_2$, ...) are arranged alternate with even field photodiodes 11 ($e_1$, $e_2$, ...) in the vertical direction and the stored charges resulting from light image signals are simultaneously transmitted to vertical transferring CCDs 12. Thus, of the pair of vertically transmitted light signal charges comprising one odd field line and one even field line the charge of the odd field line is transmitted to the second horizontal readout CCD 15 during the horizontal blanking time (i,e., within the flyback time of 10 $\mu$sec) and the charge of the even field line is transmitted to the first horizontal readout CCD. In this case, the gate electrode 14 serves the function of further transmitting the odd field light signal charge transmitted to the CCD 13 to the CCD 15 between the CCDs 13 and 15.

Then, the pair of light signal charges are respectively read out simultaneously as video signals "video 1" and "video 2" from output terminals 16 and 17.

By repeating this operation, the resulting odd field video signals "video 1" and even field video signals "video 2" are respectively generated from the output terminals 16 and 17.

The method of transmitting each pair of light signal charges comprising one odd field line and one even field line to the horizontal readout CCDs 15 and 13, respectively, will now be described with reference to FIG. 2.

Assume that initially clock pulses $\phi$1h1, $\phi$1h2, $\phi$2h1 and $\phi$2h2 are respectively off, on, off and on so that a potential well is produced in the horizontal readout CCDs 15 and 13, respectively, that the gate electrode 14 therebetween is off since a clock pulse $\phi$g is off and that a given signal charge is stored in each of electrodes 12-$O_1$ and 12-$e_1$ of the vertical transferring CCDs 12 ((1) of FIG. 2).

When the gate electrode 14 is turned on ((2) of FIG. 2) by a clock pulse $\phi$g and then clock pulses $\phi$1V and $\phi$2V are applied to the vertical transferring CCDs 12 thereby effecting the vertical transmission ((3) of FIG. 2), the light signal charge of one odd field line is applied to the first and second horizontal readout CCDs 13 and 15, respectively ((4) of FIG. 2). Then, the potential of the first horizontal readout CCD is increased by turning off the clock pulse $\phi$2h2 ((5) of FIG. 2) and then the gate electrode 14 is turned off by turning off the clock pulse $\phi$g, thus completing the transmission to the second horizontal readout CCD 15 of the light signal charge of the odd field line ((6) of FIG. 2).

Then, the clock pulse $\phi$2h2 is turned on so that a potential well is produced in the first horizontal readout CCD ((7) of FIG. 2) and then clock pulses $\phi$1V and $\phi$2V are applied to the vertical transferring CCDs 12, thereby effecting the vertical transmission and applying to the first horizontal readout CCD 13 the light signal charge of the even field line ((8) and (9) of FIG. 2).

In this way, the light signal charges of the pair of odd and even field lines are respectively transmitted to the second and first horizontal readout CCDs 15 and 13. In FIG. 1, clock pulses $\phi$H are used for transferring the light signal charges in the photodiodes 11 to the vertical transferring CCDs 12.

Figure 3:
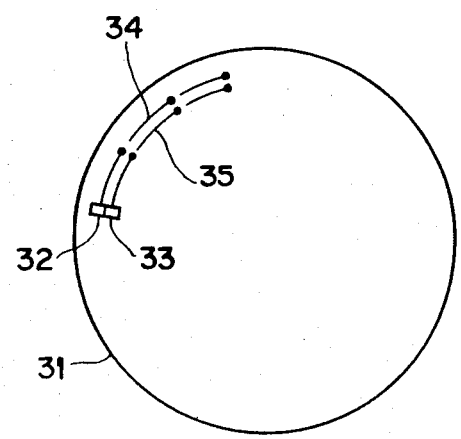
FIG. 3 is a schematic diagram showing a magnetic disk forming a recording medium and a dual channel magnetic head.

The video signals from the second and first horizontal readout CCDs 15 and 13 are delivered from the output terminals 16 and 17 and are recorded for example by a recording unit (not shown) on a magnetic disk or recording medium 31 shown in FIG. 3. For this recording, dual channel heads 32 and 33 are used and the odd and even field video signals are simultaneously recorded on special tracks 34 and 35, respectively. In this case, the recording of the vedio for each field is completed by one rotation of the magnetic disk 31 and thus the recording time is 1/60 seconds.

To read the video signals from the magnetic disk 31, during the first rotation the head 32 is used to read the odd field video signals from the track 34 and during the second rotation the head 34 is used to read the even field video signals from the track 35. By repeating this operation, it is possible to apply the interlaced signals to the television receiver.

By virtue of the above-described construction of the embodiment, the vertical resolution of the television output of a still picture can be made two times the conventional resolution, that is, the same vertical resolution as the ordinary broadcast received television picture can be obtained.

Further, while, in the above-described embodiment, the invention is incorporated in the IT-CCD area imaging device, the same effect can be obtained by including two stages of the horizontal readout CCD in the FT-CCD solid-state area imaging device. Further, while, in the embodiment, the horizontal readout IT-CCDs are arranged in the upper part of the device, the same effect can be obtained by arranging the IT-CCDs or FT-CCDs in the lower part of the device.

From the foregoing description it will be seen that in accordance with the invention a solid-state area imaging device includes two-stage horizontal readout CCDs so that the readout signals are successively recorded in two fields and are reproduced separately for each field. As a result, if the two fields are reproduced alternately, the fields are interlaced on the screen of a television receiver and thus the maximum vertical resolution is improved up to the same resolution of the vertical resolution of the ordinary received television picture.

Further, by virtue of the fact that two-stage horizontal readout CCDs are provided so that one of the CCDs is used as an exclusive odd field register and the other CCD is used as an exclusive even field register, the recording of video signals only requires the provision of a corresponding recording head to each of the registers and the construction is simplified considerably. As a result, the required construction for reproducing the stored video signals from the recording medium is also simplified considerably.

What is claimed is:

1. A solid-state area imaging device comprising:
   photoelectric conversion means including a large number of photosensitive elements arranged into a two-dimensional array;
   vertical transmitting means for successively transmitting charges produced by said photosensitive elements in a direction vertical to said two-dimensional array;
   first horizontal transferring means whereby said charges transmitted by said vertical transmitting means are transferred and outputted in a direction horizontal to said two-dimensional array;
   second horizontal transferring means placed in juxtaposition with said first horizontal transferring means; and
   gate means disposed between said first and second horizontal transferring means whereby said charges transmitted to said first horizontal transferring means by said vertical transmitting means are selectively transmitted to said second horizontal transferring means with respect to alternate horizontal lines of said two-dimensional array;
   whereby of output signals for odd scanning lines in a frame and output signals for even scanning lines in said frame one output signals are taken from said first horizontal transferring means and the other output signals are taken from said second horizontal transferring means.

2. A device according to claim 1, wherein said vertical transmitting means comprises a plurality of vertical transferring CCDs arranged on a photosensitive surface of said device with said photosensitive elements being arranged in rows therebetween whereby forming an interline transferring CCD unit as a whole.

3. A device according to claim 1, wherein said first and second transferring means respectively comprise first and second horizontal readout CCDs arranged in juxtaposition with said gate means comprising a gate electrode interposed therebetween.

* * * * *